Sept. 16, 1952      D. PEARSON ET AL      2,610,841

PLOW TYPE OF COAL MINING MACHINE

Filed Sept. 23, 1950      2 SHEETS—SHEET 1

INVENTORS;
DAVID PEARSON,
AND
JULIUS YARMAK,
BY
ATT'Y.

Sept. 16, 1952 D. PEARSON ET AL 2,610,841
PLOW TYPE OF COAL MINING MACHINE
Filed Sept. 23, 1950 2 SHEETS—SHEET 2
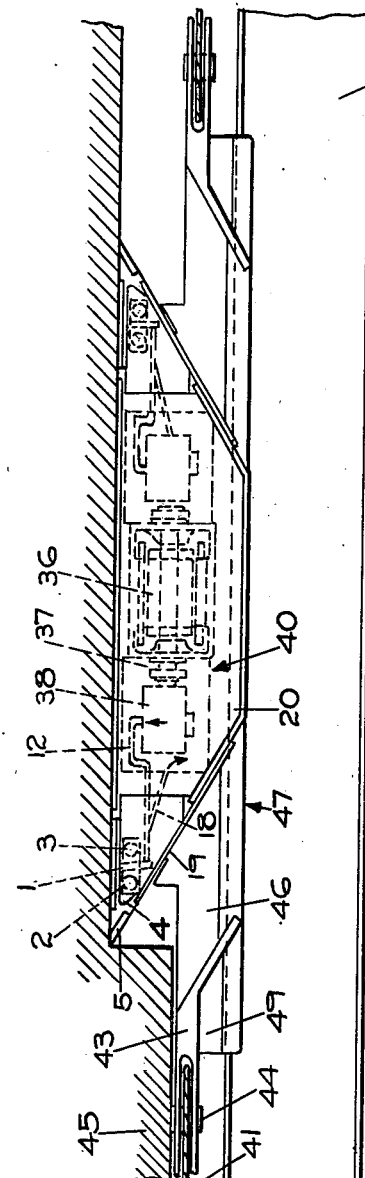
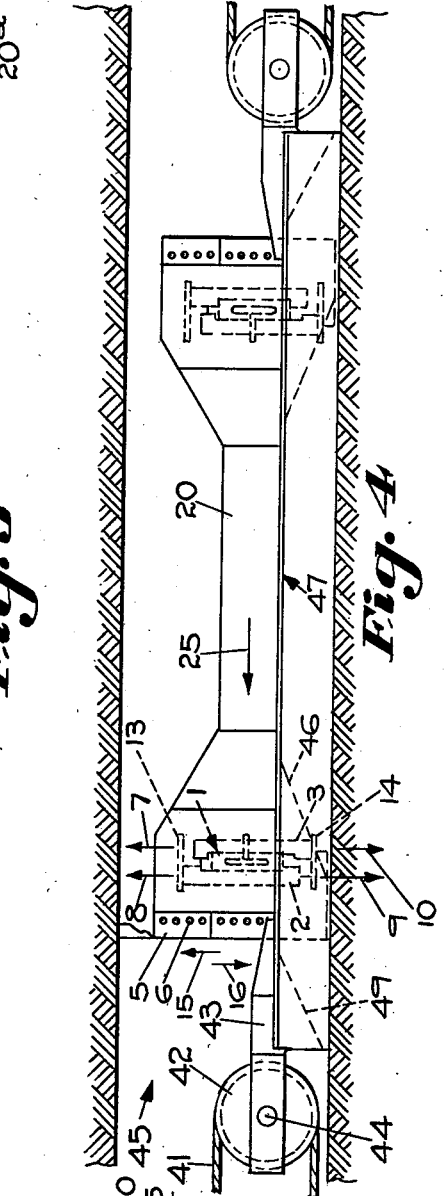
INVENTORS;
DAVID PEARSON,
AND
JULIUS YARMAK,
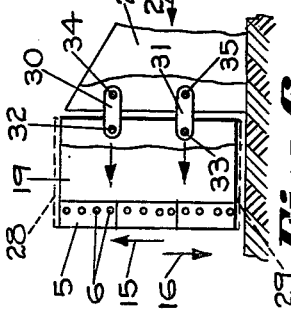
ATT'Y.

Patented Sept. 16, 1952

2,610,841

UNITED STATES PATENT OFFICE 2,610,841

PLOW TYPE OF COAL MINING MACHINE

David Pearson and Julius Yarmak, Wakefield, England, assignors to The Jeffrey Manufacturing Company, a corporation of Ohio Application September 23, 1950, Serial No. 186,362
In Great Britain July 7, 1950

1 Claim. (Cl. 262—8)

This invention relates to machines for severing coal and like minerals, the machines being of the kind which are capable of being propelled along a mineral seam face and having at least one shearing wedge or head which can be advanced into the face and is arranged to cut or shear off, by direct thrust, a thick paring of mineral from the face when the machine is propelled therealong.

A main object of the invention is generally to improve the cutting or shearing efficiency of such machines and also to reduce the thrust force necessary for the removal of any given paring.

According to the invention there is provided a machine of the kind specified for severing coal and like minerals, said machine having incorporated therein a vibrator which is capable of vibrating the shearing wedge or head whilst the latter is performing its cutting or shearing displacement, the arrangement of said vibrator being such that vibrations are set up thereby which are transverse to the direction of shearing or cutting motion and in a plane containing the cutting or shearing edge of said wedge or head.

Figure 1:
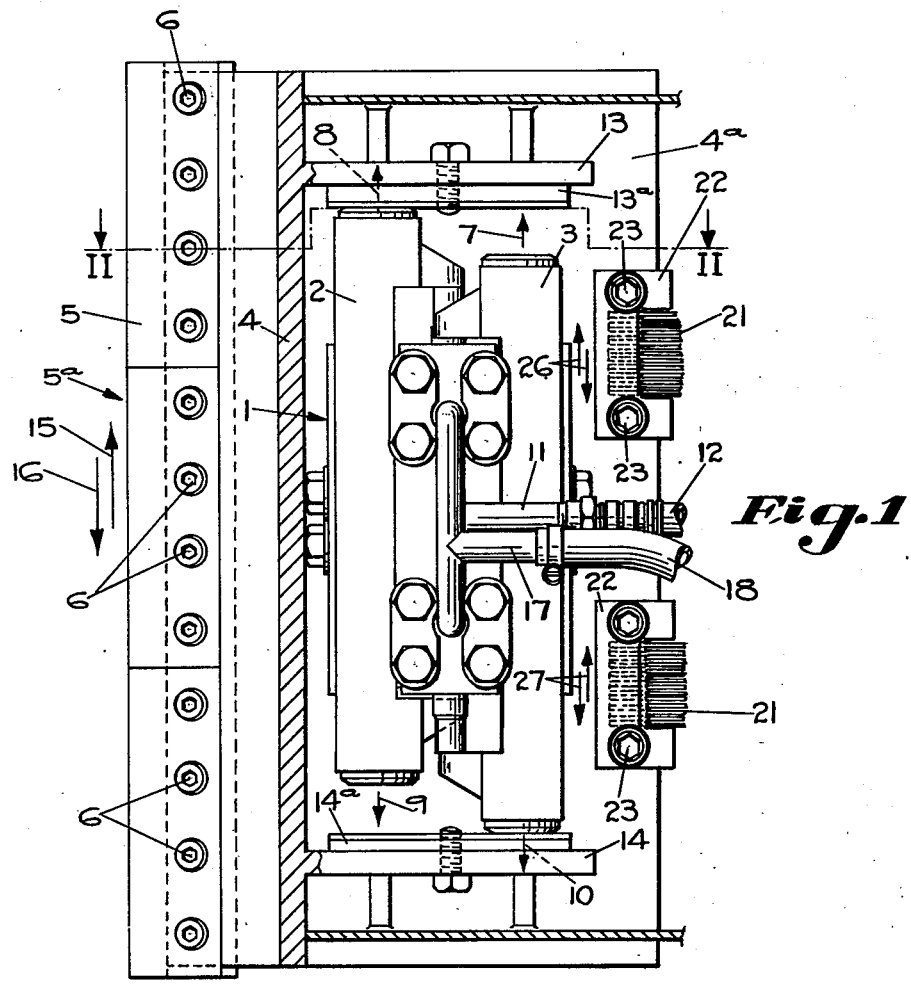
Figure 2:
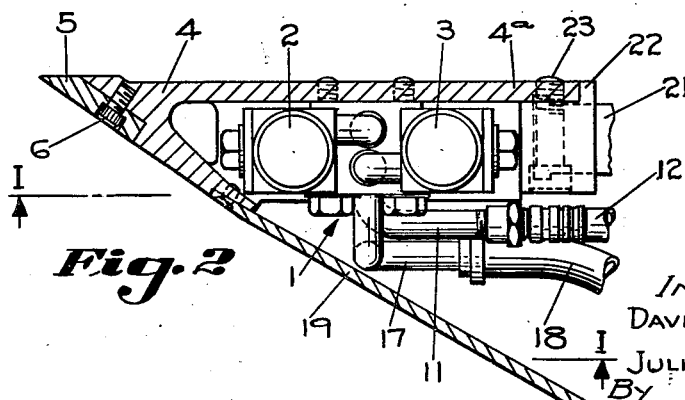

In order that the invention may be clearly understood and readily carried into effect one embodiment thereof will now be described in detail with reference to the accompanying drawings wherein:

Fig. 1 is a sectional side elevation taken on the line I—I of Fig. 2 and showing a vibrator mounted in the manner of the invention inside a shearing wedge or head of a coal severing machine, Fig. 2 is a cross-section on the line II—II of Fig. 1, Fig. 3 is a plan view, partly broken away and to a reduced scale, showing a coal severing machine according to the invention in the cutting position against a coal face, Fig. 4 is a side elevational view of the machine as shown in Fig. 3, and Figs. 5 and 6 are detail views showing respectively two different means for connecting a shearing wedge or head to the severing machine body.

Referring now to the drawings and in particular to Figs. 1 and 2, a vibrator 1 having strikers 2 and 3, is mounted inside a shearing wedge 4 which forms part of a coal severing machine or plough. The shearing wedge 4 is provided with a shearing blade 5 having a cutting or shearing edge 5a (see Fig. 1) and made up of short pieces each screwed in position on the wedge 4 by screws 6. The strikers 2 and 3 are adapted to perform quick reciprocating movement, as shown by arrows 7, 8, 9 and 10 respectively, under the influence of hydraulic fluid under pressure supplied to the vibrator through inlet pipe 11 and 12 so as to strike upon ribs 13 and 14 faced respectively with rubber or spring elastic covers 13a, 14a and formed integrally with the wedge 4. In this way, force impulses are imposed causing vibration of the whole shearing wedge 4 and directed along the shearing blade 5 as shown by the arrows 15 and 16 (see Fig. 1). Worked out hydraulic fluid is delivered from the vibrator through outlet pipe 17 and 18.

The shearing wedge 4 is provided with a detachably connected vertical wall 19 (Fig. 2) to assist in guiding and loading the coal upon a conveyor 20a (Fig. 3). The manner of construction and operation of one vibrator which may be employed is disclosed in greater detail in our copending application Serial No. 186,361, filed September 23, 1950 for a High Speed Multiple Cylinder Hydraulic Vibrator.

The shearing wedge or head 4 may be connected to the machine or plough body 20 (Figs. 3 and 4) by means of flat springs 21 (Figs. 1, 2 and 5) fixed securely by their forward ends to the back plate 4a of shearing wedge 4 by means of brackets 22 and screws 23. The back ends of the springs 21 are fixed in a similar manner by means of brackets 24 (Fig. 5) to the coal plough body 20. The described connection permits transmission of the thrusting force shown by arrow 25 in Figs. 3 to 6 and permits simultaneously vibration of the shearing head 4 in a plane transverse to the direction of thrusting force and which contains the cutting or shearing edge 5a of the blade 5. The direction of vibration of the blade in the example illustrated is indicated by arrows 26 and 27 in Figs. 1, 5 and 6 and the extent thereof by dotted lines 28 and 29 in Figs. 5 and 6.

An alternative means of flexibly connecting the shearing head 4 to the plough body 20 is shown in Fig. 6. This connection comprises links 30 and 31 pivotally mounted on the shearing head 4 by pins 32 and 33 and on the coal plough body by pins 34 and 35.

A coal severing machine or plough as shown in Figs. 3 and 4 may be single or double-headed, the heads in the latter case being used alternatively according to the direction of travel of the plough.

Inside the plough body 20 is built an electric or compressed air motor 36 driving, by means of a coupling 37, a hydraulic pump 38 immersed in hydraulic oil in container 40. From pump 38 oil under pressure is supplied through the flexible pipe 12 and pipe 11 to the vibrator 1 and worked out oil is discharged through the pipe 17 and the outlet pipe or hose 18 back into the container 40.

The coal severing machine or plough in the particular example illustrated is adapted for haulage rope propulsion in which a steel wire rope 41 passes around a pulley 42 mounted, in a projecting bracket 43 of the machine, on a pivot pin 44. The severing machine during its travel along the coal face 45 slides between the coal face and the face conveyor 20a and picks up and loads, by means of the slope surface 46, broken and severed coal, this coal being lifted over the loading edge 47 of the face conveyor by means of the aforesaid slope surface. A forward ramp 49 treats in the same way any small coal which would otherwise obstruct the rope pulley 42.

As will be readily appreciated other well known methods of propulsion may alternatively be employed for displacing the severing machine or plough along the coal face.

It has been found in practice that, by imparting vibrations in the manner described to the shearing head it is possible considerably to reduce the thrust force necessary to cut off a given paring and thereby the overall efficiency of the machine is materially increased.

It will of course also be appreciated that, whilst a machine for severing coal has been described, the invention is equally applicable to machines employed for severing any other similar mineral which it is desired to remove in parings from a seam face. Similarly the invention is not limited to the use of hydraulic vibrators and any other form of vibrator may alternatively be employed to produce the required action for causing longitudinal vibration of the shearing wedge or head.

Obviously those skilled in the art may make various changes in the details and arrangement of parts without departing from the spirit and scope of the invention as defined by the claim hereto appended, and applicants therefore wish not to be restricted to the precise construction herein disclosed.

Having thus described and shown an embodiment of the invention, what it is desired to secure by Letters Patent of the United States is:

A shearing type coal mining machine including a body, means resiliently mounting a shearing head on said body, said shearing head having a shearing blade operable to shear coal as said machine is fed along a coal face, and vibratory mechanism contained within said head and operable to vibrate said head.

DAVID PEARSON.
JULIUS YARMAK.

REFERENCES CITED

The following references are of record in the file of this patent:

UNITED STATES PATENTS

| Number | Name | Date |
| --- | --- | --- |
| 511,869 | Warner | Jan. 2, 1894 |
| 651,758 | Ochtinsky | June 12, 1900 |
| 1,199,127 | Storrs | Sept. 26, 1916 |
| 1,563,153 | Brackett et al. | Nov. 24, 1925 |
| 2,228,445 | DeVelbiss | Jan. 14, 1941 |
| 2,308,517 | Könnerth | Jan. 19, 1943 |

FOREIGN PATENTS

| Number | Country | Date |
| --- | --- | --- |
| 343,517 | Germany | Nov. 4, 1921 |
| 365,168 | Germany | Dec. 9, 1922 |
| 901,915 | France | Aug. 9, 1945 |